Figure 1:
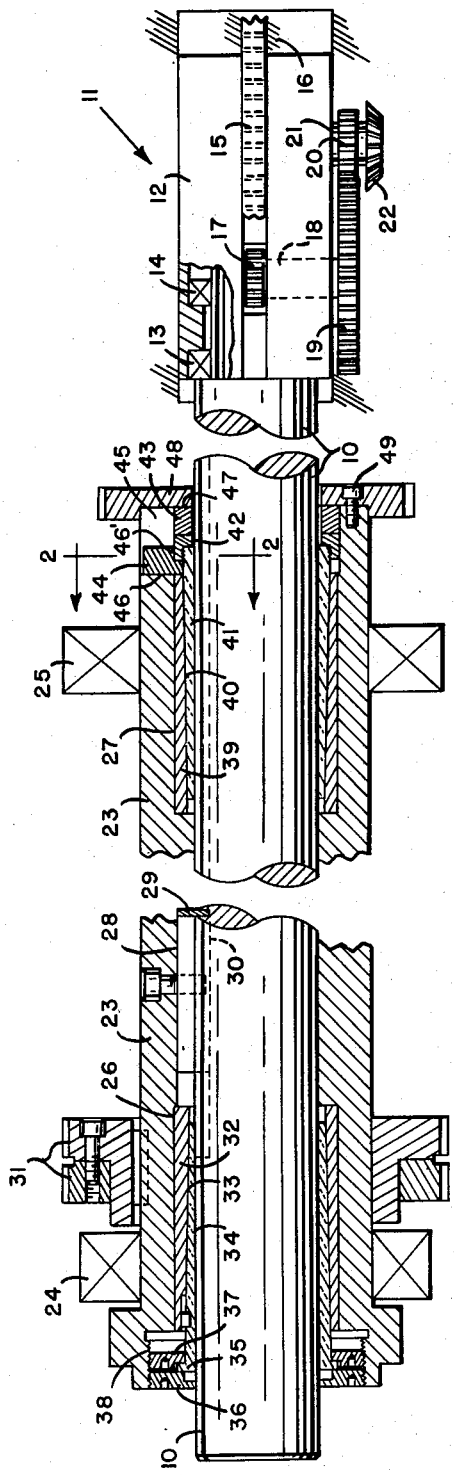

Dec. 31, 1963   E. P. BULLARD III, ET AL   3,115,796
BEARING
Filed Jan. 2, 1962

INVENTORS
EDWARD P. BULLARD III
BY EDWARD P. BULLARD IV

United States Patent Office 3,115,796
Patented Dec. 31, 1963

3,115,796
BEARING
Edward P. Bullard III and Edward P. Bullard IV, Fairfield, Conn., assignors to The Bullard Company, Bridgeport, Conn., a corporation of Connecticut
Filed Jan. 2, 1962, Ser. No. 163,688
4 Claims. (Cl. 77—3)

The present invention relates to plain bearings, and particularly to a new and improved bearing assembly for the spindle of a horizontal boring machine and the like.

The tool-supporting spindle of horizontal boring mills is required to rotate and to move axially under varying loads at varying speeds during working operations with an absolute minimum of deflection and/or chatter. The problems encountered in the past in attempting to achieve this result have been difficult, and their solutions have left much to be desired.

The principal object of the present invention is to provide a bearing mounting for the spindle of a horizontal boring mill and the like in which a minimum of spindle deflection and/or chatter occurs during the performance of working operations by the mill.

Another object of the invention is to provide such a bearing which will be adjustable to eliminate radial clearance.

Still another object of the invention is to provide such a bearing in which chatter is eliminated.

Another object of the invention is to provide such a bearing in which the bearing itself prevents the transfer of heat.

Still another object of the invention is to provide such a bearing that will have a long life.

In one aspect of the invention, the spindle of a horizontal boring mill may be mounted in ball bearings within a non-rotatable, axially movable housing. The housing may support pinions in mesh with a rack that is fixed against axial movement in the frame of the machine so that upon the rotation of the pinions, axial movement of the housing, and with it the rotatable spindle, will be effected. The forward end of the spindle may be spline keyed to a rotatable, axially fixed sleeve that may be driven from the headstock of the mill.

In another aspect of the invention, the forward end of the sleeve may have internally mounted therein a bushing having a tapered internal surface, within which may be mounted a mating bushing having a tapered exterior surface and a cylindrical interior surface journaling the rotatable spindle.

The bushing journaling the rotatable spindle has a continuous uninterrupted cylindrical inner surface and preferably is made from a laminated base material such as paper, woven fabric, asbestos, glass or synthetic fibers impregnated with a thermosetting plastic such as a synthetic varnish and bonded together under heat and pressure.

In still another aspect of the invention, a similar bushing may be located at the rear of the rotatable sleeve. It has been found that the movement of the tapered, non-metallic bushings at each end of the sleeve toward each other causes the elimination-of-wear clearance between them and the spindle; that the spindle is prevented from chattering; that substantially little heat is transferred through the non-metallic bushings; and that the bearing has a long life.

The above, other objects and novel features of the invention will become apparent from the following specification and accompanying drawing which is merely exemplary.

Figure 2:
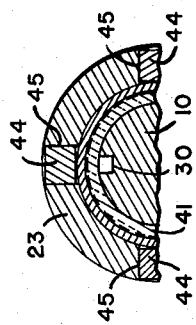

In the drawing:

FIG. 1 is a sectional plan view of a spindle of a horizontal boring mill to which the principles of the invention have been applied; and FIG. 2 is a sectional view taken substantially along line 2—2 of FIG. 1.

Referring to FIGS. 1 and 2, the principles of the invention are shown as applied to a rotatable and axially movable spindle 10 of a machine tool such as a horizontal boring mill, hving one end connected to a gear and rack construction 11. A non-rotatable housing 12 supports the righthand end of the spindle 10 for rotation within antifriction bearings 13 and 14. A rack 15 is fixed to a housing 16 of a tool head (not shown), which latter supports the non-rotatable housing 12 for axial movement with the spindle 10. The rack 15 meshes with spur gear means 17 fixed to a shaft 18. The shaft 18 is journaled in the housing 12 with one end of said shaft fixed to a gear 19. The gear 19 meshes with a gear 20 fixed to a shaft 21. One end of the shaft 21 is fixed to a bevel gear 22 that may be connected through proper gearing to a power source (not shown).

From the foregoing it is evident that rotation of the bevel gear 22 in either direction will effect the rotation of spur gear 17. Rotation of the spur gear 17, which is in mesh with the rack 15, will cause axial feeding movement of the spindle 10.

The spindle 10 may be mounted for axial movement within a hollow shaft 23. The hollow shaft 23 may be supported by antifriction bearings 24 and 25 mounted within a housing of the tool head (not shown). The hollow shaft 23 may be provided at each end with counterbores 26 and 27 and a key way 28 in which is fixed a key 29. The key 29 is adapted to cooperate with an elongated key way 30 within the spindle 10. Gears 31, which are also fixed to the hollow shaft 23, may be connected through proper gearing to a power source (not shown).

From the foregoing it is evident that rotation of gears 31 will cause the rotation of spindle 10 through key 29.

The counterbore 26 may receive a fixed bushing 32 having a tapered inside diameter 33 that cooperates with a tapered adjustable bushing 34. The bushing 34 may be provided with a flange 35 that cooperates with adjustable nuts 36 and 37. The adjustable nuts 36 and 37 are threadingly mounted in a threaded hole 38 of the hollow shaft 23. The tapered bushing 34 may be made from a laminated base material such as paper, woven fabric, asbestos, glass, or syntheic fibers impregnated with a thermosetting plastic such as a synthetic varnish or the like and bonded together under heat and pressure. One such material is known in the trade as "Spauldite" manufactured by the Spaulding Fibre Company, Inc., of Tonawanda, New York. It has been found that when such a plastic, externally tapered bushing having a cylindrical inner surface is forced into a rigid, stationary, internally tapered bushing, the internal, cylindrical, inner diameter of the plastic bushing will reduce in diameter uniformly throughout its length.

From the foregoing it is evident that adjustable rotation of the nuts 36 and 37 will effect the axial movement of the tapered bushing 34, taking up any play between it and spindle 10 that might develop due to wear.

The counterbore 27 may be provided with a fixed bushing 39 also having a tapered inside wall 40 that cooperates with a tapered adjustable bushing 41 which may be made from the same material as bushing 34. The bushing 41 may be threaded to a flange ring 42 that cooperates with a spacing ring 43 as well as with spacing blocks 44. The blocks 44 are mounted within slots 45 in the end of shaft 23 (FIG. 2), in abutting relation with the end surface 46 of said slots. The blocks 44 may be undercut at 46' to partially receive the flange ring 42. The spacing ring 43 is adapted to abut a surface 47 on a gear 48 that is fixed to the hollow shaft 23 by cap screws 49.

From the foregoing it is evident that by employing blocks 44 and rings 43 of different thicknesses, axial adjustment of the tapered bushing 41 can be effected, thus adjusting the radial clearance between it and the spindle 10.

As previously described, the tapered bushings 34 and 40 preferably are of non-metallic material, thus preventing the transfer of heat to or from the spindle 10.

Although the various features of the new and improved adjustable spindle bushings have been shown and described in detail to fully disclose one embodiment of the invention, it will be evident that changes may be made in such details and certain features may be used without others without departing from the principles of the invention.

What is claimed is:

1. In a horizontal boring mill, a spindle; a plain bearing for said spindle comprising a rotatable, axially fixed sleeve through which said spindle extends; means for spline-keying said sleeve to said spindle so that said spindle can be rotated as well as axially moved; a non-metallic bearing bushing having a cylindrical inner surface and a tapered outer surface between said spindle and said sleeve, said non-metallic bushing having a continuous, non-interrupted annular cross section throughout its entire effective length; metal mating surface means between said bearing bushing and said sleeve; and means for axially moving said bearing bushing relative to said mating surface means for uniformly contracting the internal diameter of said bearing bushing to eliminate wear clearance between said non-metallic bearing bushing and spindle.

2. In a horizontal boring mill, a spindle; a plain bearing for said spindle comprising a rotatable, axially fixed sleeve through which said spindle extends; means for spline-keying said sleeve to said spindle so that said spindle can be rotated as well as axially moved; separate non-metallic bearing bushings having cylindrical inner surfaces and tapered outer surfaces between said spindle and said sleeve and located at each end of said sleeve, said non-metallic bushings having continuous, non-interrupted annular cross sections throughout their entire effective length; metal mating surface means between said bearing bushings and said sleeve; and means for axially moving said bearing bushings relative to said mating surface means for uniformly contracting the internal diameter of said non-metallic bearing bushings to eliminate wear clearance between said bearing bushings and spindle.

3. In a horizontal boring mill, a spindle; a plain bearing for said spindle comprising a rotatable, axially fixed sleeve through which said spindle extends; means for spline-keying said sleeve to said spindle so that said spindle can be rotated as well as axially moved; a non-metallic bearing bushing having a cylindrical inner surface and a tapered outer surface between said spindle and said sleeve, said non-metallic bushing having a continuous, non-interrupted annular cross section throughout its entire effective length; a metallic bushing having a cylindrical outer surface and a tapered inner surface between said bearing bushing and said sleeve; and means for axially moving one of said bushings relative to the other for contracting the internal diameter of said non-metallic bearing bushing to eliminate wear clearance between said bearing bushing and spindle.

4. In a horizontal boring mill, a spindle; a plain bearing for said spindle comprising a rotatable, axially fixed sleeve through which said spindle extends; means for spline-keying said sleeve to said spindle so that said spindle can be rotated as well as axially moved; separate non-metallic bearing bushings having cylindrical inner surfaces and tapered outer surfaces between said spindle and said sleeve and located at each end of said sleeve, said non-metallic bushings having continuous, non-interrupter annular cross sections throughout their entire effective lengths; a metallic bushing having a cylindrical outer surface and a tapered inner surface between each bearing bushing and said sleeve; and means for axially moving one of said bushings at each end of said sleeve relative to the other for uniformly contracting the internal diameter of said non-metallic bearing bushings to eliminate wear clearance between said bearing bushings and sleeve.

References Cited in the file of this patent

UNITED STATES PATENTS

| | | |
|---|---|---|
| 1,437,560 | Shearer | Dec. 5, 1922 |
| 1,484,878 | Flaherty | Feb. 26, 1924 |
| 2,619,879 | Hosea | Dec. 2, 1952 |